United States Patent
Böhnke et al.

(10) Patent No.: US 6,545,997 B1
(45) Date of Patent: Apr. 8, 2003

(54) TRANSMISSION METHOD AND TRANSMISSION APPARATUS FOR TRANSMITTING SIGNALS ON THE BASIS OF A OFDM/TDMA-SYSTEM WITH PILOT SYMBOLS

(75) Inventors: Ralf Böhnke, Esslingen (DE); Seiichi Izumi, Fellbach (JP)

(73) Assignee: Sony International (Europe) GmbH, Berlin (DE)

( * ) Notice: Subject to any disclaimer, the term of this patent is extended or adjusted under 35 U.S.C. 154(b) by 0 days.

(21) Appl. No.: 09/253,666

(22) Filed: Feb. 19, 1999

(30) Foreign Application Priority Data

Feb. 22, 1998 (EP) .............................. 98103101

(51) Int. Cl.⁷ .................... H04J 11/00; H04B 7/212
(52) U.S. Cl. .................. 370/347; 370/203; 370/329; 370/478; 455/552
(58) Field of Search ................... 370/203, 204, 370/206, 208, 210, 329, 330, 335, 336, 342, 343, 344, 347, 478, 479, 480; 455/552, 454; 375/260

(56) References Cited

U.S. PATENT DOCUMENTS

| | | | |
|---|---|---|---|
| 5,684,795 A | * | 11/1997 | Daniel et al. ............... 370/347 |
| 5,828,650 A | * | 10/1998 | Malkamaki et al. ........ 370/203 |

FOREIGN PATENT DOCUMENTS

| | | |
|---|---|---|
| EP | 0 441 731 A1 | 8/1991 |
| EP | 0 562 868 A2 | 9/1993 |
| EP | 0 734 132 A2 | 9/1996 |
| EP | 0 752 779 A2 | 1/1997 |
| EP | 0 760 564 A2 | 3/1997 |
| EP | 0 786 890 A2 | 7/1997 |
| EP | 0 810 746 A2 | 12/1997 |
| EP | 0 825 741 A2 | 2/1998 |
| EP | 0939527 A1 * | 9/1999 ........... H04L/27/26 |
| WO | WO 97/01256 | 1/1997 |

OTHER PUBLICATIONS

Larsson et al.: "Mixed traffic in multi carrier system" 1996 IEEE Vehicular Technical Conference, Apr. 28, 1996—New York, US, pp. 1259–1263, XP000593147.

* cited by examiner

*Primary Examiner*—Duc Nguyen
(74) *Attorney, Agent, or Firm*—Frommer Lawrence & Haug LLP; William S. Frommer; Darren M. Simon

(57) ABSTRACT

The present invention relates to a transmission method and a transmission apparatus for transmitting signals on the basis of a OFDM/TDMA-system, wherein a plurality of subcarriers being orthogonal to each other are allocated to a variable number of channels, each channel containing a variable number of subcarriers depending on information to be transmitted in said signals, wherein, for the transmission of said signals in a GSM-system having a constant number of predetermined GSM-frequency channels and a constant number of predetermined GSM-timeslots being grouped in GSM-frames, the number of said subcarriers is allocated corresponding to the bandwidth of said GSM-frequency channels, so that a multiple of one resulting OFDM/TDMA-timeslot matches with one or a multiple of one GSM-timeslots, wherein a pilot symbol is allocated to every n-th subcarrier in said GSM-frequency-channels, whereby n is an integer and>1, and wherein said signals are transmitted.

The present invention also proposes a receiving method and a receiving apparatus for receiving corresponding signals. Thereby, a reliable channel estimate and equalization can be performed.

15 Claims, 9 Drawing Sheets

TRANSMISSION METHOD AND TRANSMISSION APPARATUS FOR TRANSMITTING SIGNALS ON THE BASIS OF A OFDM/TDMA-SYSTEM WITH PILOT SYMBOLS

FIELD OF THE INVENTION

The present invention relates to a transmission method and a transmission apparatus for transmitting signals on the basis of an OFDM-TDMA-system and further to a receiving method and a receiving apparatus for receiving signals transmitted by means of such a transmission method.

BACKGROUND OF THE INVENTION

A transmission method and a transmission apparatus for transmitting signals on the basis of a OFDM/TDMA-system are explained relating to FIGS. 1–4 of the present application. In such a transmission method and apparatus, a plurality of subcarriers 1 being orthogonal to each other can be allocated to a variable number of channels $U_0$, $U_1$ ... $U_9$, each channel $U_0$, $U_1$ ... $U_9$ containing a variable number of subcarriers 1 depending on information to be transmitted as shown in FIGS. 1–4. FIG. 1 shows a group of ten frequency channels $U_0$, $U_1$ ... $U_9$. Each frequency channel $U_0$, $U_1$ ... $U_9$ can contain a variable number of subcarriers depending on information to be transmitted, as shown for the channels $U_0$ and $U_1$ in FIG. 2. The channel $U_0$ contains a plurality of subcarriers 1, and the channel $U_1$ contains a number of subcarriers 1 different from channel $U_0$. In a transmission method and the transmission apparatus for transmitting signals on the basis of a OFDM/TDMA-system, a variable number of subcarriers 1 can be allocated to each channel depending on the amount of information to be transmitted. The channel $U_0$ shown in FIG. 2 contains 21 subcarriers 1, whereas the channel $U_1$ shown in FIG. 2 contains only 10 subcarriers 1. Therefore, the channel $U_0$ can be transmitted by more than twice the transmission rate of the channel $U_0$. On the border of each channel $U_0$, $U_1$ ... $U_9$, a single subcarrier having zero power is placed as guard band 2 to minimize interference to users placed in the adjacent frequency band or to fulfill certain spectrum masks. If the influence of an interference by the band in the neighborhood is small, the guard band 2 need not to be provided, whereas, when the influence is excessive, a plurality of guard bands 2 can be provided.

The subcarriers 1 are generated by orthogonal frequency division multiplex (OFDM) processing. As shown in FIG. 3, W(f) indicates a wave form indicating an energy on the frequency axis and B(Hz) indicates the distance between two adjacent subcarriers. The OFDM processing provides for a multi-subcarrier-system, wherein the number of channels which can be multiplexed is not limited by an interference from the other channels and can be freely determined depending on the bandwidth to be allocated. By changing the number of the subcarriers to be allocated to the different channels, it is possible to change the transmission rate or to achieve a variable transmission rate. The subcarriers between the respective channels can be easily separated by means of a filter, thereby making it possible to prevent deterioration of S/N characteristics. Since the OFDM processing is used for the multi-subcarrier modulation, a guard band S is not necessarily needed between different channels, thereby achieving a very high spectral efficiency. Further on, because fast Fourier transformation can be utilized, the necessary processing can be rapid and small.

Further on, the number of channels in each group of channels can be varied, as shown in FIG. 4. In FIG. 4, a group of six channels $U_0$, $U_1$ ... $U_5$ is shown. In a OFDM/TDMA-system, the number of channels in a group of channels can be varied within the system frequency band depending on information to be transferred.

In the known and standardized GSM-System, a type of single carrier frequency modulation called GMSK is used. The frequency channels are constant and the spacing (bandwidth) between adjacent frequency channels is 200 kHz. The number of FDMA-channels is 124 and a time division multiple access (TDMA) is used to support the number of parallel connections. The TDMA scheme in the GSM-System is 8 GSM-timeslots within one time frame. The GSM-timeslot length is 576,9 µs (15/26 ms), as is shown in FIG. 5. As can be seen in FIG. 5, the transmitted GSM-timeslots are not fully occupied by the transmitted burst to reduce interference from adjacent GSM-timeslots if the system is not perfectly synchronized. The guard period is 8,25 bits, which corresponds to 30,5 µs. The guard period is divided in two parts, wherein one of the parts is located at the beginning of the GSM time slot, and the other part is located at the end of the GSM-timeslot.

A GSM time frame consists of 8 GSM time slots and has therefore a length of 4615,4 µs, as is shown in FIG. 6. The GSM-system supports slow frequency hopping, which is explained in FIG. 6. The shown GSM-timeslot 3 is a receiving timeslot. According to the time division duplex (TDD)-system of the GSM-system, a corresponding transmission GSM-timeslot 4 is transmitted some timeslots later. Further on, the GSM-system makes use of the frequency division duplex (FDD)-system with 45 MHz between uplink and downlink, so that the transmission GSM-timeslot 4 is transmitted in the corresponding uplink frequency band, when the receiving GSM-timeslot 3 had been sent in the uplink frequency band, or vice versa. The next succeeding receiving GSM-timeslot 5 is of course transmitted in the same uplink or downlink frequency band as the preceding GSM-timeslot 3, but in a different frequency channel, according to the slow frequency hopping. The frequency hopping improves, together with the interleaving procedure, the transmission of the signals in view of the frequency and interference diversity. The usual interleaving depth in the GSM-system is 36,923 ms corresponding to 8×8 GSM-timeslots.

When transmitting signals between a base station and one or more mobile stations, the mobile channel introduces multipath distortion on the signaling wave forms. Both the amplitude and phase are corrupted as the channel characteristics changes because of movements of the mobile station. In order to perform a coherent detection of the transmitted signals, reliable channel estimates are required. This can be obtained by occasionally transmitting known data or so-called pilot symbols. The corresponding receiving side interpolates the channel information derived from the pilot symbols to obtain a channel estimate for equalizing the received data signal. The pilot symbol is thereby known both by the transmitting and the receiving apparatus.

BRIEF SUMMARY OF THE INVENTION

The object of the present invention is therefore to provide a transmission method and a transmission apparatus for transmitting signals on the basis of an GSM compatible OFDM-TDMA-system and further a receiving method and a receiving apparatus for receiving such signals, which allow for a reliable channel estimation on the receiving side.

This object is achieved by a transmission method, a transmission apparatus, a receiving method and a receiving apparatus according to the claims.

Advantageous features of the present invention are defined in the respective subclaims.

The transmission method for transmitting signals on the basis of a OFDM/TDMA-system comprises the steps of allocating a plurality of subcarriers being orthogonal to each other to a variable number of channels, each channel containing a variable number of subcarriers depending on information to be transmitted in said signals, wherein, for the transmission of said signal in a GSM-system having a constant number of predetermined GSM-frequency channels and a constant number of predetermined GSM-timeslots being grouped in GSM-frames, a number of said subcarriers is allocated corresponding to the bandwidth of said GSM-frequency channels, so that a multiple of one resulting OFDM/TDMA-timeslots matches with one or a multiple of one GSM-timeslot, wherein a pilot symbol is allocated to every n-th subcarrier, whereby n is an integer and n>1, and transmitting said signals.

The transmission apparatus for transmitting signals on the basis of a OFDM/TDMA-system according to the present invention comprises allocation means for allocating a plurality of subcarriers being orthogonal to each other to a variable number of channels, each channel containing a variable number of subcarriers depending on information to be transmitted in said signals, wherein said allocation means, for the transmission of said signals in a GSM-system having a constant number of predetermined GSM-frequency channels and a constant number of predetermined GSM-timeslots being grouped in GSM-frames, allocate a number of said subcarriers corresponding to the bandwidth of said GSM-frequency channels so that a multiple of one resulting OFDM/TDMA-timeslot matches with one or multiple of one GSM-timeslot and for allocating a pilot symbol to every n-th subcarrier, whereby n is an integer and n>1, and transmission means for transmitting said signals.

In the presented transmission system, the signals are transmitted in or on the basis of an OFDM/TDMA-system, which is backward compatible to the standardized GSM-system. The transmission band of this OFDM/TDMA-system can be the same or can be different from the known GSM frequency band. A respective number of subcarriers of the OFDM/TDMA-system are allocated so that their bandwidth matches or corresponds to the bandwidth or a multiple of the bandwidth of the GSM frequency channels. Signals formed in an OFDM/TDMA system can in this way be transmitted and/or received also in an GSM-system.

The allocation of pilot symbols to every n-th subcarrier according to the present invention allows an accurate and reliable channel measurement and consequently a reliable correction of the received data signals on the receiving side. In case that a multiple of one OFDM/TDMA-timeslot matches with one GSM-timeslot, the pilot symbols in adjacent OFDM/TDMA-timeslots are advantageously frequency interlaced in respect to each other. Thereby, not only a frequency interpolation, but also a time interpolation of the channel transfer function on the receiving side is enabled to assure a reliable correction of the received data signals. The pilot symbols in adjacent OFDM/TDMA-timeslots can be symmetrically interlaced, whereby one pilot symbol is allocated to a subcarrier in the frequency middle between two respective pilot symbols of an adjacent OFDM/TDMA-timeslot. Thereby, an optimized interpolation on the basis of the received pilot symbols for estimating the channel transfer function on the receiving side can be performed.

In a further advantageous embodiment of the present invention, 48 of said subcarriers are allocated corresponding to the bandwidth of said GSM-frequency channels, so said 2 OFDM/TDMA-timeslots match with 1 GSM-timeslot, whereby n=6 or n=8. By choosing these parameters, the number of used pilot symbols is optimized. The use of pilot symbols for a channel function estimation introduces an overhead to the transmitted signals, which cannot be used for the transmission of data signals, and it is thus desirable to keep the number of pilot symbols low. On the other hand, a high number of pilot symbols is required on the receiving side to assure a reliable channel function estimate for a correction of the received data signals. The presented parameters define an optimized choice in view of these contradicting criteria. Further on, these parameters are chosen in view of the use of the present invention in an indoor environment, in which the channel transfer function, e.g. the channel attenuation, is a generally flat curve. In this case, only a small number of pilot symbols is necessary for a usable estimation. In an outdoor environment, however, a larger number of pilot symbols in each transmission channel, for example an GSM-frequency channel is necessary to enable the estimation of a usable channel transfer function. The reason is that in an outdoor environment, the channel transfer function, e.g. the channel attenuation, can have large variations due to multipath effects and a faster moving speed of the mobile stations. Therefore, it is necessary to tailor the pilot symbols to each base station side and also to choose the number of transmitted pilot symbols correspondingly. The parameters defined in the subclaims 4 and 8 are particularly useful in an indoor environment, in which the channel attenuation has a generally flat curve and the moving speed of the mobile stations is comparatively low.

In the transmission apparatus and the transmission method, the number of subcarriers to be allocated corresponding to the bandwidth of one GSM-frequency channel can be chosen, so that several OFDM/TDMA-timeslots are mapped into one GSM-timeslot, or several OFDM/TDMA-timeslots are mapped into several GSM-timeslots, e.g. eight GSM-timeslots (one GSM-frame). In the OFDM/TDMA-system, the transformation of one or a plurality of the subcarriers into the time domain results in a OFDM/TDMA-time burst. According to the present invention, one OFDM/TDMA timeslot contains essentially one OFDM/TDMA-time burst.

A very important consequence of the mapping of the OFDM/TDMA-timeslots into the GSM-timeslots is that the same interleaving depth as in a standard GSM-system can be obtained. A standard GSM-interleaving depth is 8×8 GSM-timeslots (approx. 36,923 ms). In the present invention, one or more OFDM/TDMA-timeslots (e.g. two, four, . . . ) are mapped into one GSM-timeslot. Therefore, the information units to be transmitted according to the system of the present invention can be smaller than in the standard GSM-system. This is advantageous in view of the interleaving depth. If, for example, two OFDM/TDMA-timeslots are mapped into one GSM-timeslot, and 8 OFDM/TDMA-timeslots form one frame (8-TDMA), an interleaving depth of 8 frames (same as GSM) results in a total interleaving delay of 18,461 ms, which is half of the corresponding total interleaving delay of 36,923 ms in the GSM-system. Therefore, the transmission of information in a system according to the present invention can have a smaller overall delay with the same interleaving (frequency and interference diversity). An interleaving depth of 16 frames (approx. 36,923 ms) results in the same overall delay as in the standard GSM-system, but is much more reliable in view of transmission problems (time-, frequency- and interference diversity). For the transmission of speech signals, usually a smaller interleaving delay is desired due to the real time requirements. For example, for the transmission of speech signals interleaving depths smaller than 40 ms and short time-frames (4–10 ms) are advantageous. For the transmission of data signals, the real time requirements are not so important, so that a longer interleaving depth can be chosen to improve the data transmission reliability.

Advantageously, the signals to be transmitted are interleaved with a total interleaving delay corresponding to 8×8 GSM-timeslots. Alternatively, the signals to be transmitted are interleaved with a total interleaving delay corresponding to 4×8 GSM-timeslots.

Further on, the allocating step can comprise the steps of generating a clock, modulating a signal to be transmitted and producing said number of subcarriers according to said clock, transforming said subcarriers into time range bursts, and generating said OFDM/TDMA-timeslots by adding a guard time, a ramp time and an adaptation guard time to each of said time range bursts.

Correspondingly, the allocation means can comprise clock generation means for generating a clock, a modulation means for modulating a signal to be transmitted and producing said number of subcarriers according to said clock, a transformation means for transforming said subcarriers into time range bursts, and a timeslot generation means for generating said OFDM/TDMA-timeslots by adding a guard time, a ramp time and an adaptation guard time to each of said time range bursts.

According to further aspects advantageous, numbers of subcarriers to be allocated corresponding to the bandwidth of said GSM frequency channels are defined, so that the resulting OFDM/TDMA-timeslots match well into one or a multiple of one GSM-timeslot.

In the following description, the OFDM/TDMA signals are formed and transmitted in a GSM system. A number of OFDM/TDMA subcarriers is allocated to one or more GSM frequency channels in the standardized GSM transmission band. The present invention is, however, not limited to this example and the OFDM/TDMA transmission band can be different from the GSM transmission band. In this case, the OFDM/TDMA frequency channels are different from the GSM frequency channels. The subcarriers of the OFDM/TDMA system, however, are allocated so that their bandwidth matches or corresponds essentially to the bandwidth or a multiple of the bandwidth of the GSM frequency channels, to assure the compatibility.

BRIEF DESCRIPTION OF THE DRAWINGS

In the following detailed description, the present invention is explained by means of preferred embodiments relating to the respective drawings, in which.

DETAILED DESCRIPTION OF THE INVENTION

Figure 1:
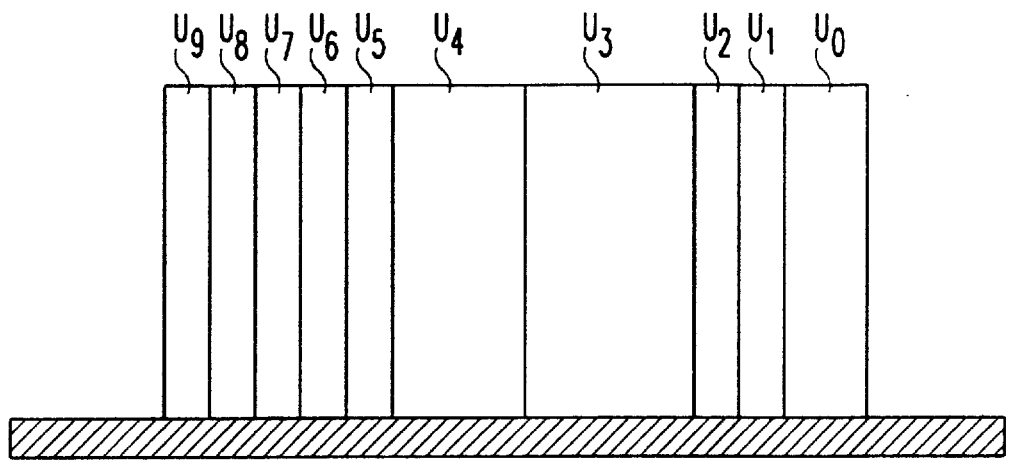
FIG. 1 shows a first group of channels of an OFDM/TDMA-system having variable sizes
Figure 2:
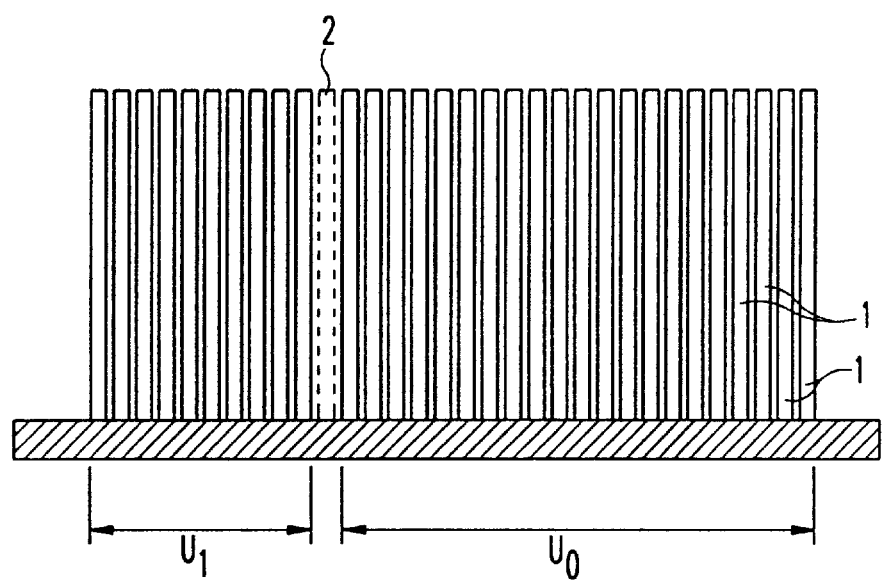
FIG. 2 shows two of the channels shown in FIG. 1 in more detail to explain the variable number of subcarriers in each channel.
Figure 3:
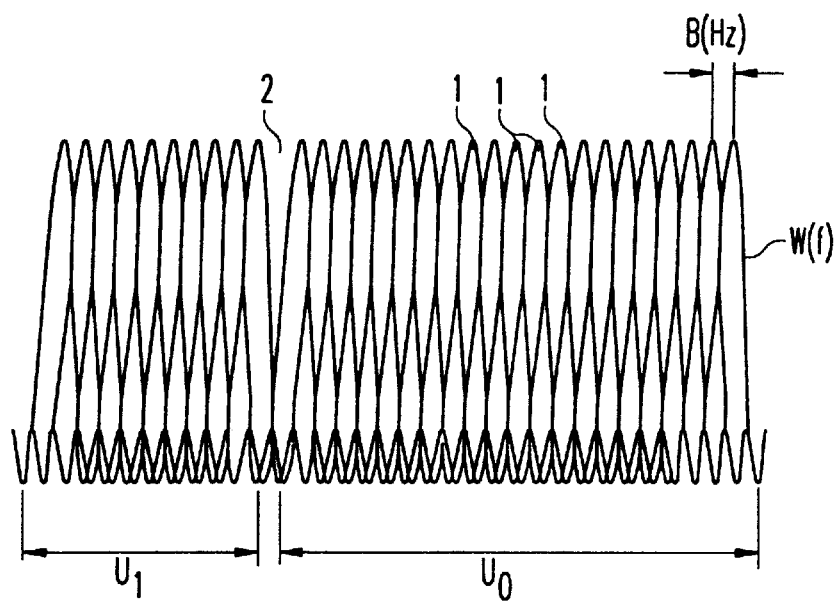
FIG. 3 shows the wave form of the subcarriers in the two channels shown in FIG. 2 in more detail.
Figure 4:
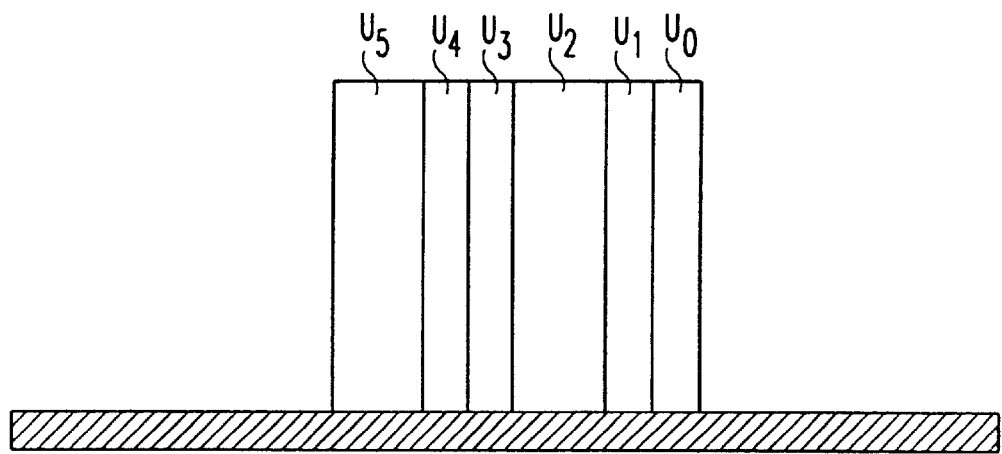
FIG. 4 shows a second group of channels different from the group shown in FIG. 1 to explain the variable group size in an OFDM/TDMA-system.
Figure 5:
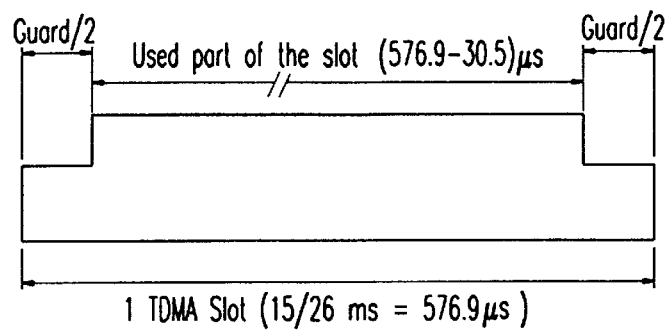
FIG. 5 shows the structure of a standard GSM-timeslot.
Figure 6:
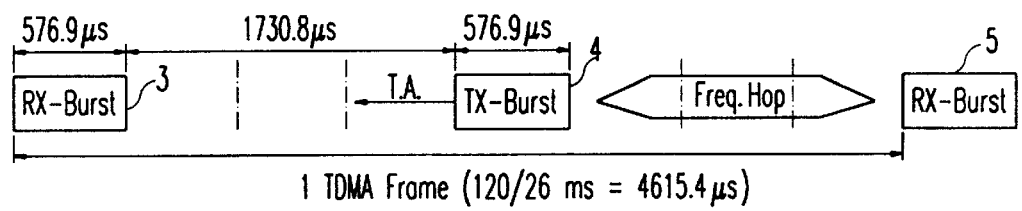
FIG. 6 shows a structure of a standard GSM-frame to explain the principle of TDD and FDD in a standard GSM-System.
Figure 7:
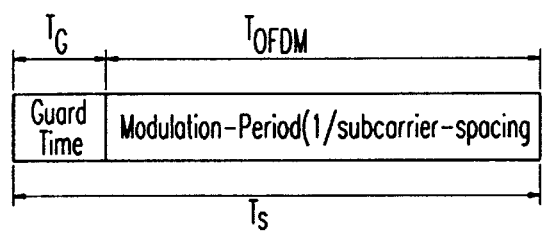
FIG. 7 shows the general structure of an OFDM/TDMA-timeslot.

The general features of an OFDM/GTMDA-system have been explained above relating to FIGS. 1–4. The general features of a GSM-system have been explained above relating to the FIGS. 5 and 6. According to the present invention, a number of subcarriers of a OFDM/TDMA-system is allocated to each GSM-frequency channel so that a multiple of one resulting OFDM/TDMA-timeslots matches with one ore a multiple of one GSM-timeslot. The spacing between two adjacent GSM-frequency channels is 200 kHz, and the length of a GSM-timeslot is 15/26 ms. According to the present invention, one GSM-frequency channel is divided into a number of subcarriers. The number of subcarriers is chosen, so that a multiple of one resulting OFDM/TDMA-timeslot fits well in one or a multiple of one GSM-timeslot. A transformation of one subcarrier from the frequency domain into the time domain results in an OFDM/TDMA-time burst, which builds the largest part of a resulting OFDM/TDMA-timeslot. In FIG. 7, the basic structure of an OFDM/TDMA-timeslot is shown. The basic structure of an OFDM/TDMA-timeslot contains an OFDM/TDMA-time burst, whereby the length of the OFDM/TDMA-timeburst $T_{OFDM}$ corresponds to the effective Modulation Period and depends on the subcarrier-spacing (1/subcarrier-spacing). The subcarrier spacing depends thereby on the number of subcarriers allocated to one GSM-frequency channel of 200 kHz. In front of the OFDM/TDMA-time burst $T_{OFDM}$, a guard time $T_G$ (pre-guard time) is located.

Figure 8:
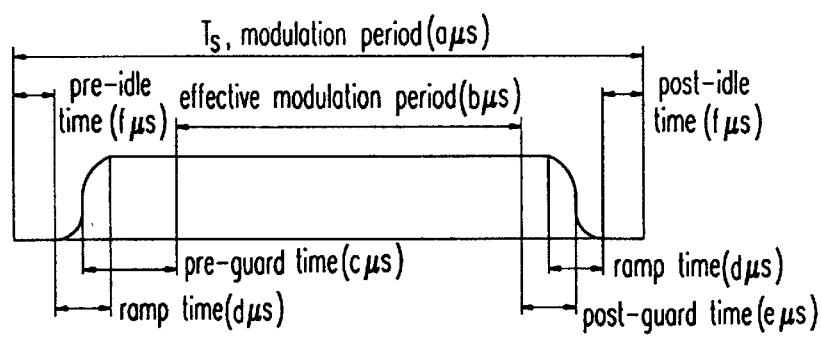
FIG. 8 shows the structure of an OFDM/TDMA-timeslot in more detail.

In FIG. 8, the detailed structure of an OFDM/TDMA-timeslot is shown. The length of the OFDM/TDMA-timeslot corresponds to the modulation period and has a length of a in μs. After the transformation of the subcarriers into the time domain, whereby the OFDM/TDMA-timebursts are produced, a guard time consisting of a pre-guard time and a post-guard time is added to the OFDM-TDMA-timebursts. The OFDM/TDMA-timebursts correspond to the effective modulation period and have a length of b in µs. The length of the pre-guard time located in front of the OFDM/TDMA-timebursts in c in µs and the length of the post-guard time located behind the OFDM/TDMA-timebursts is e in µs. Then, before transmitting, the time-domain signal is shaped to reduce spurious emissions.

Thereby, the ramp of the time domain signal is shaped according to a raised cosine function, as shown in FIG. 8. As can be seen in FIG. 8, the ramp time in the front part and the back part of the OFDM/TDMA-timeslot, respectively, has a length of d in µs and overlaps partially with the pre-guard time and the post-guard time, respectively. The length of the post-guard time can be 0 µs. At the beginning of the OFDM/TDMA-timeslot there is located a pre-idle time in front of the ramp time and at the end of the OFDM/TDMA-timeslot there is located a post-idle time behind the ramp time. The length of the pre-idle time and the post-idle time is f in µs. Therefore, the resulting OFDM/TDMA-timeslot is composed of the OFDM/TDMA-timeburst (effective modulation period), the guard time consisting of the pre-guard time and the post-guard time, the ramp times and the pre-idle time and the post-idle time. The length b of the OFDM/TDMA-timeburst depends on the subcarrier spacing (b=1/$f_{SCS}$), whereby $f_{SCS}$ is the subcarrier spacing in Hz. According to the present invention, the length a of one OFDM/TDMA-timeslot can for example correspond to 1, ½, ⅓ or ¼ GSM-timeslot.

Figure 9:
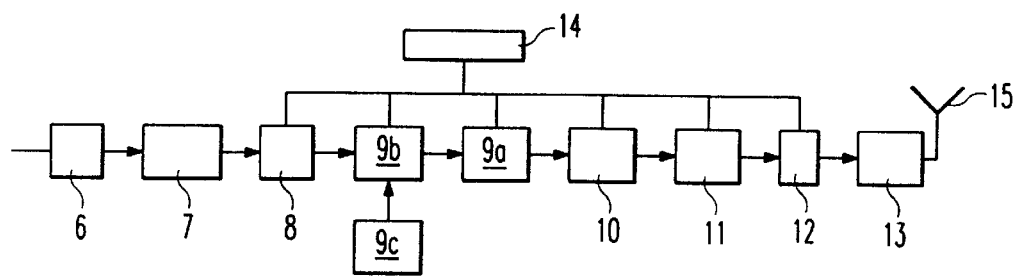
FIG. 9 shows the basic scheme of a transmission apparatus according to the present invention.

In FIG. 9, the basic scheme of a transmission apparatus according to the present invention is shown. Signals 6 to be transmitted are fed into a channel coding means 7. The channel coded signals are fed into an interleaving means 8, where they are interleaved according to a chosen interleaving depth, for example 8×8 OFDM/TDMA-frames or 16×8 OFDM/TDMA-frames. In a switch means 9b, pilot symbols generated in a pilot symbol generation means 9c are interposed and allocated to the data stream of the interleaved signals coming from the interleaving means 8. The interleaved signals are fed into a modulation means 9a, in which a OFDM processing is conducted to produce a chosen number of subcarriers. The switch means 9b is set so that in each GSM-frequency channel known pilot symbols are located or modulated on every n-th subcarrier in between the subcarriers carrying and being modulated with data signals to be transferred. This part of the transmission apparatus is shown in more detail in FIG. 15. The subcarriers are transformed in an inverse discrete or fast Fourier transformation means 10 into the time domain. In a timeslot formation means 11, the time domain bursts are provided with a guard time $T_G$, and the time bursts are shaped, for example with a raised cosine function. The OFDM/TDMA-timeslots are then converted in a D/A-converter 12 from digital into analog signals and then upconverted in a RF-upconversion means 13. The thus processed signals are then transmitted by an antenna 15. A clock generation means 14 provides the interleaving means 8, the modulation means 9a, the switch means 9b, the inverse discrete/fast Fourier transformation means 10 and the timeslot formation means 11 with the necessary clock signals. The clock generation means 14 can contain a switching means to change the clock depending on the required transmission system. For example, the clock generating means 14 could, controlled by the switching means, provide the modulation means 9a with different clock signals to produce different numbers of subcarriers.

Figure 10:
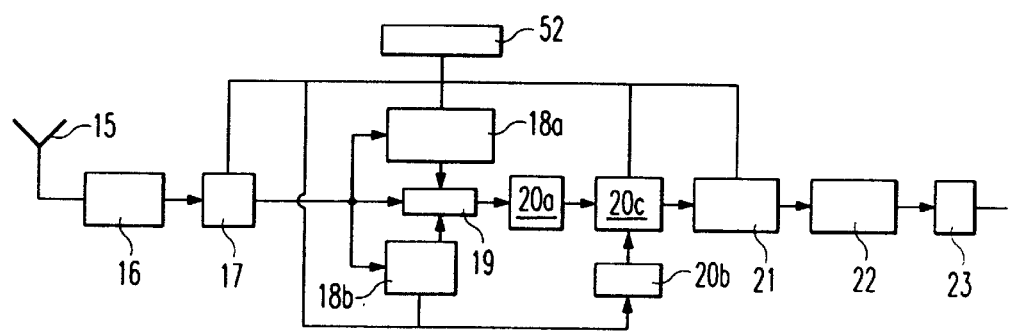
FIG. 10 shows the basic scheme of a receiver apparatus according to the present invention.

In FIG. 10, a basic scheme of a receiving apparatus according to the present invention is shown. An antenna 15 receives transmitted signals, which are downconverted in a RF-downconversion means 16. Then, the downconverted signals are digitized in a A/D-converter 17. The thus converted signals are transformed in a discrete/fast Fourier transformation means 19 into the frequency range, whereby the discrete/fast Fourier transformation means 19 is time and frequency synchronized by a time synchronization means 18a and a frequency synchronization means 18b. The frequency domain signals output by the discrete/fast Fourier transformation means 19 of the above-mentioned subcarriers being modulated with data signals, signaling signals, pilot signals etc. Are demodulated in a demodulation means 20a. An estimation means 20b receives the pilot symbols within the resulting data stream. Thereby, the estimation means 20b of the receiving apparatus is set corresponding to the switch means 9b and the pilot symbol generation means 9c of the corresponding transmission apparatus. In other words, in the transmission system of the present invention, the transmission apparatus and the receiving apparatus work on the basis of respectively known pilot symbols and of a respectively known pilot symbol modulation rate of the subcarriers in each GSM-frequency channel. If, for example, the transmission apparatus is implemented in a mobile station and the receiving apparatus is implemented in a base station of a wireless telecommunication system, the mobile station and the base station respectively know the pilot symbols and know, which respective subcarriers are carrying pilot symbols. The estimation means 20b of the receiving apparatus compares the received pilot symbols to the known pilot symbols, e.g. stored in a memory, and performs an estimation of a channel transfer function, e.g. the channel attenuation, based on the known pilot symbol and further performs a time and/or frequency interpolation to generate an estimated channel transfer function. By means of the estimated channel transfer function, an equalization means 20c equalizes the transmitted data symbols. Thereby, a reliable and correct equalization of the transmitted data can be achieved, as will be explained in more detail relating to FIGS. 16 and 17. The equalized signals are de-interleaved in a de-interleaving means 21. The de-interleaved signals are then channel decoded in a channel decoding means 22. The channel decoded data 23 can then be further processed as required. The time synchronization means 18a, the frequency synchronization means 18b, discrete Fourier transformation means 19, the demodulation means 20a, the estimation means 20b, the equalization means 20c, and the de-interleaving means 21 are provided with the necessary clock signals by a clock generating means 52.

In the following, advantageous combinations of subcarrier numbers and numbers of OFDM/TDMA-timeslots to be mapped into one or more GSM-timeslots are presented as preferred solutions for the backward compatibility of a OFDM/TDMA-system in a GSM-system. Thereby, the used frequency slot serving as a basis for the backward compatibility is 200 kHz, which corresponds to the bandwidth of the frequency channels of the GSM-system. The number of the subcarriers is chosen to assure a backwards compatibility of a OFDM/TMDA-system to the GSM-timeslot structure or GSM-frame structure. Thereby, even multiple of one GSM-timeslot or one GSM-frame are subdivided into proper designed OFDM/TDMA-timeslots resulting from the number of subcarriers. According to the present invention it is further ensured that an interleaving utilizing a cross-interleaving to enhance the time-frequency diversity and the GSM-backward compatibility is possible. Also, realistic delays, for example for speech signals, and relaxed interleaving delay constraints, for example for the transmission of data signals, are considered. The following preferred embodiments are identified as the best solutions for an OFDM/TDMA-system to be GSM-backward compatible in channel allocation (frequency) and time structure (GSM-timeslots or GSM-frames).

In the following embodiment it is proposed to map 1, 2, 3 or 4 OFDM/TDMA-timeslots into one GSM-timeslot. Thereby, the pre-guard time and post-guard time are optional but advantageous.

1$^{st}$ Embodiment

In a 1$^{st}$ embodiment, the total number of subcarriers is 48, whereby one or more subcarriers on the borders can be left unmodulated to reduce the interference to adjacent frequency slots. The resulting subcarrier spacing is 200 kHz/48=4,166 kHz, which leads to a OFDM/TDMA-time burst $T_{OFDM}$ of 48/200 kHz=240 µs. The symbol duration (240 µs) is therefore very long compared to the GSM-symbol duration (range of µs), which has the advantage to avoid intersymbol interference due to the radio channel delay profile.

The guard time (pre-guard time and post-guard time) in the first embodiment is set to 30 µs, whereby it has to be noted that the guard time has to be set according to the expected channel delay profile (multipath environment). The ramp time is set to 10 to 20 µs, so that the total OFDM/TDMA-timeslot $T_S$ has a length of 280 to 290 µs. This fits very well into ½ of the basic GSM-timeslot of 576,923 µs. Therefore, in the 1$^{st}$ embodiment, two OFDM/TDMA-timeslots are mapped into one GSM-timeslot with an adaptation time guard, if necessary.

The basic clock is 240 µs/64=3.75 µs. The guard time (pre- and post guard time) can be set to 30 µs (pre-guard: 22.5 µs=6 samples, post-guard: 7.5 µs=2 samples) and the ramp time can be set to 15.0 µs (=4 samples) which leads to a total symbol time of (250 µs/64)*(64+6+2+4)=285 µs.

The preferred interleaving scheme in the first embodiment bases on an OFDM/TDMA-frame length of 2,3077 ms, i.e. 8 OFDM/TDMA-timeslots $T_S$. The preferred interleaving depth is 8×8 OFDM/TDMA-frames (total interleaving delay 18,461 ms) or 16×8 OFDM/TDMA-frames (total interleaving delay 36,923 ms). Also an interleaving depth of 12×8 OFDM/TDMA-frames is possible (total interleaving delay 27,692 ms). An interleaving depth of 8×8 OFDM/TDMA-frames therefore allows a data transmission with the same interleaver design and performance as in standard GSM, whereas an interleaving depth of 16*8 OFDM/TDMA-frames allows a data transmission with the same interleaving delay as in the standard GSM system, but with much better performance (interleaving gain).

2$^{nd}$ Embodiment

In the 2$^{nd}$ embodiment, the total number of subcarriers is chosen to be 32, wherein one or more subcarriers at the borders can be left unmodulated to reduce the interference to adjacent frequency slots. The subcarrier spacing is 200 kHz/32=6.25 kHz, which leads to a OFDM/TDMA-burst of 1/6.25 kHz=160 µs. The guard time (pre- and post guard time) can be set to 20 µs and the ramp time can be set to 10.0 µs, which leads to a total OFDM/TDMA-timeslot of 190 µs. 3 OFDM/TDMA-timeslots $T_S$ are mapped into one GSM-timeslot with an adaptation time guard. In other words, one OFDM/TDMA-timeslot $T_S$ is mapped into ⅓ of a GSM-timeslot.

The basic clock is set to 160 µ/32=5 µs. To be more precise, the guard time (pre- and post guard time) can be set to 20 µs (pre-guard: 15.0 µs=3 samples, post-guard: 5 µs=1 sample) and the ramp time can be set to 10.0 µs (=2 samples) which leads to a total symbol time of (160 µs/32)*(32+3+1+2)=190 µs.

The preferred interleaving scheme for the 2$^{nd}$ embodiment bases on one OFDM/TDMA-frame containing 6 OFDM/TDMA-timeslots mapped into 2 GSM-timeslots. The preferred interleaving depth is 4×4 OFDM/TDMA-frames (total interleaving delay 18,461 ms) or 8×4 OFDM/TDMA-frames (total interleaving delay 36,923 ms). Also, the interleaving depth can be set to 6×4 OFDM/TDMA-frames (total interleaving delay 27,692 ms).

3$^{rd}$ Embodiment

In the 3$^{rd}$ embodiment, the total number of subcarriers is chosen to be 24, wherein one or more subcarriers at the borders can be left unmodulated to reduce the interference to adjacent frequency slots. The subcarrier spacing is 200 kHz/24=8.33 kHz, which leads to an OFDM/TDMA-burst of 1/8.33 kHz=120 µs. The guard time (pre- and post guard time) can be set to 15 µs and the ramp time can be set to 9 µs, which leads to a total OFDM/TDMA-timeslot of 144 µs. 4 OFDM/TDMA-timeslots $T_S$ are mapped into one GSM-timeslot with an adaptation time guard. The scheme according to the 3$^{rd}$ embodiment is very advantageous for fast varying channel environments. In other words, one OFDM/TDMA-timeslot $T_S$ is mapped into ¼ of one GSM-timeslot.

The basic clock is set to 120 µs/32=3.75 µs. To be more precise, the guard time (pre- and post guard time) can be set to 15 µs (pre-guard: 11.25 µs=3 samples, post-guard: 3.75 µs=1 sample) and the ramp time can be set to 7.5 µs (=2 samples) which leads to a total symbol time of (120 µs/32)*(32+3+1+2)=142.5 µs.

The preferred interleaving scheme for the 3$^{rd}$ embodiment bases on one OFDM/TDMA-frame containing 4 OFDM/TDMA-timeslots mapped into 1 GSM-timeslot. The preferred interleaving depth is 4×4 OFDM/TDMA-frames (total interleaving delay 18,461 ms) or 8×4 OFDM/TDMA-frames (total interleaving delay 36,923 ms). Also, the interleaving depths can be set to 6×4 OFDM/TDMA-frames (total interleaving delay 27,692 ms).

4$^{th}$ Embodiment

In the 4$^{th}$ embodiment, the total number of subcarriers is chosen to be 104, wherein one or more subcarriers at the borders can be left unmodulated to reduce the interference to adjacent frequency slots. The subcarrier spacing is 200 kHz/104=1.923 kHz, which leads to a OFDM/TDMA-burst of 1/1.923 kHz=520 µs. The guard time (pre- and post guard time) can be set to 25 µs and the ramp time can be set to 15 µs, which leads to a total OFDM/TDMA-timeslot of 560 µs. One OFDM/TDMA-timeslot is mapped into one GSM timeslot with an adaptation guard of 17 µs. The basic clock is set to 520 µs/128=4.0625 µs. To be more precise, the guard time (pre-and post guard time) can be set to 28.4375 µs (pre-guard: 20.3125 µs=5 samples, post-guard: 8.125 µs=2 sample) and the ramp time can be set to 12.1875 µs (=3 samples) which leads to a total symbol time of (520 µs/128)*(128+5+2+3)=560.625 µs.

The interleaving scheme is the same as for GSM (8 frames within the 8 TDMA). In all the above described embodiments, the interleaving scheme can be dynamically changed for various data rates. For applications with less severe delay requirements, e.g. for data services or picture and video services, the interleaver schemes of the above described embodiments can be enhanced to dramatically improve the time and frequency diversity effect. However, to ensure GSM-compatibility, 2, 4 and 8 GSM-timeslots for the mapping schemes utilizing 1 GSM-timeslot are preferred. For the mapping schemes using one GSM-frame as a basic OFDM/TDMA-frame, multiples of 1, 2 and 4 are preferred.

The above presented compatibility schemes allow the combined usage of OFDM/TDMA-and GSM-systems with a minimum adaptation effort. Also, a GSM- to OFDM/TDMA-handover and vice versa can be easily performed. The interoperation of the two systems is described in one following example referring to FIGS. 11 and 12.

Figure 11:
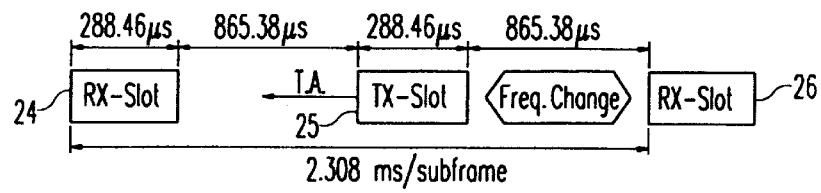
FIG. 11 shows the basic structure of an OFDM/TDMA-frame being compatible with a GSM-system.

In FIG. 11, a principle OFDM/TDMA-frame consisting of 8 OFDM/TDMA-timeslots is mapped into half GSM-timeslots, which results in a total of 16 OFDM/TDMA-timeslots being mapped into 8 GSM-timeslots. In other words, 2 OFDM/TDMA-timeslots are mapped into 1 GSM-timeslot. In FIG. 11, a subframe of 2,308 ms containing 8 OFDM/TDMA-timeslots is shown. A OFDM/TDMA-timeslot 24 is a timeslot for receiving data, the OFDM/TDMA-timeslot 25 is a timeslot for transmitting data, and a OFDM/TDMA-timeslot 26 is the next corresponding timeslot for receiving data in the next subframe. Between two timeslots 25 and 26, a slow frequency hopping can occur. The subframe length of 2,308 ms allows 16 subframes in 36,923 ms. This is important for the interleaving means used according to the present invention. The interleaving means spreads the data bits over 16 subframes, which gives a good robustness against transmission errors using time, frequency and interference diversity, and the overall interleaving delay is still only 36,92 ms. As explained above, a small interleaving delay is important for speech connections due to the real time requirement. The interleaving of the 16 OFDM/TDMA-subframes corresponds exactly to the interleaving depth of 8×8 GSM-frames having a length of 36,923 ms.

Figure 12:
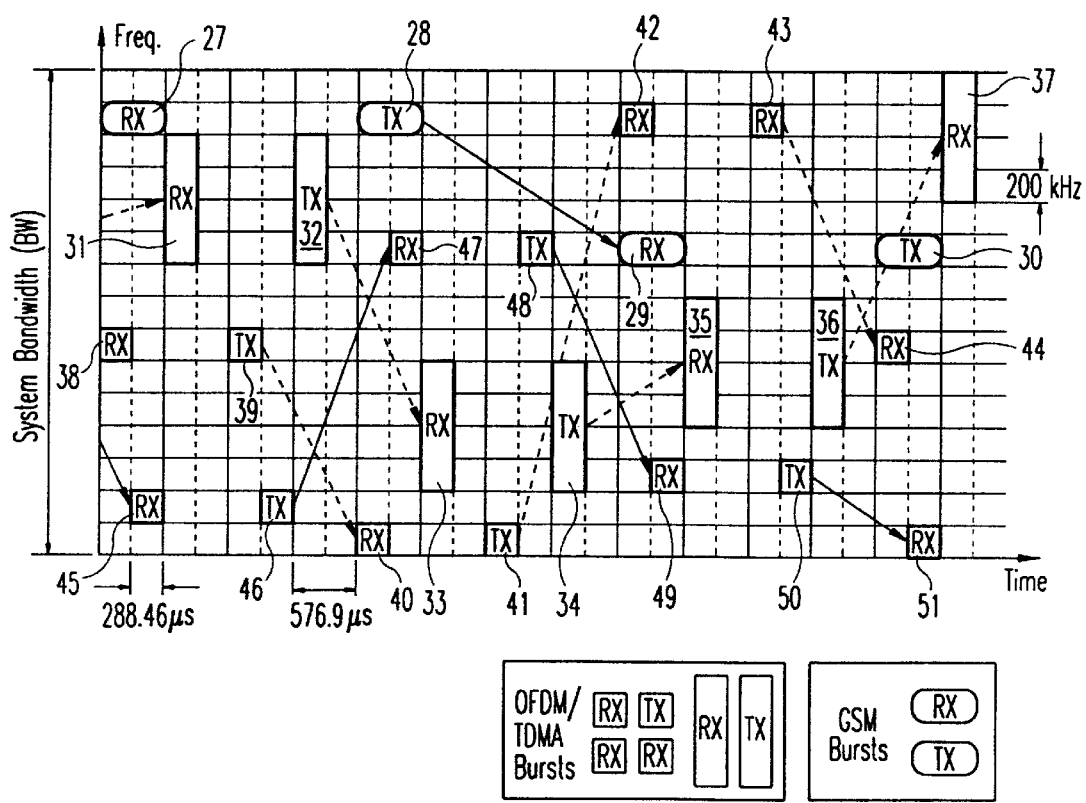
FIG. 12 shows a time-frequency grid; in a common OFDM/TDMA- and GSM-system according to the present invention.

With the parameters explained above, the OFDM/TDMA-system can coexist with the existing GSM-system and is backward compatible in timeslots, frequency and interleaving. Furthermore, the systems can coexist in a common system with a common allocated frequency range. One advantage of the present invention is that multiple timeslots and/or multiple frequency slots can be allocated to one user to enhance the data rate. In FIG. 12, a time-frequency grid in a common OFDM/TDMA- and GSM-system is shown. FIG. 12 shows the time/frequency slot allocation for 3 OFDM/TDMA users and 1 GSM user. The OFDM/TDMA users use schemes as explained in relation to FIG. 11 with one OFDM/TDMA-timeslot mapped into one half of a GSM-timeslot. Two of the OFDM/TDMA-users transmit data with a normal data rate within the GSM-frequency channel of 200 kHz, whereas the third OFDM/TDMA user transmits data with a high data ate within 4 GSM frequency channels.

The GSM-user uses a receiving GSM-timeslot 27, a transmitting GSM-timeslot 28, a receiving GSM-timeslot 29 and a transmitting GSM-timeslot 30. Between the transmitting GSM-timeslot 28 and the receiving GSM-timeslot 29, a slow frequency hopping takes place, and between the respective receiving and transmitting GSM-timeslots, a TDMA-process is carried out. The first OFDM/TDMA-user transmitting data with a normal data rate uses a first receiving OFDM/TDMA-timeslot 38, the transmitting OFDM/TDMA-timeslot 39, a receiving OFDM/TDMA-timeslot 40, a transmitting OFDM/TDMA-timeslot 41, a receiving OFDM/TDMA-timeslot 42, a transmitting OFDM/TDMA-timeslot 43 and a receiving OFDM/TDMA-timeslot 44. Between the respective receiving and transmitting OFDM/TDMA-timeslots, a TDMA-process is carried out, whereas between the respective transmitting timeslots and the next receiving timeslot, a slow frequency hopping takes place. The same is true for a second user, which uses a receiving OFDM/TDMA-timeslot 45, a transmitting OFDM/TDMA-timeslot 46, a receiving OFDM/TDMA timeslot 47, a transmitting OFDM/TDMA-timeslot 48, a receiving OFDM/TDMA-timeslot 48, a transmitting OFDM/TDMA-timeslot 50 and a receiving OFDM/TDMA timeslot 51. The third OFDM/TDMA user transmitting data with a high data rate uses a receiving OFDM/TDMA-timeslot 31, a transmitting OFDM/TDMA-timeslot 32, a receiving OFDM/TDMA-timeslot 33, a transmitting OFDM/TDMA-timeslot 34, a receiving OFDM/TDMA-timeslot 35, a transmitting OFDM/TDMA-timeslot 36 and a receiving OFDM/TDMA-timeslot 37. Also for the third OFDM/TDMA-user, a TDMA-processing is carried out between respective receiving and transmitting timeslots, and a slow frequency hopping is taking place between respective transmitting and receiving timeslots.

Figure 13:
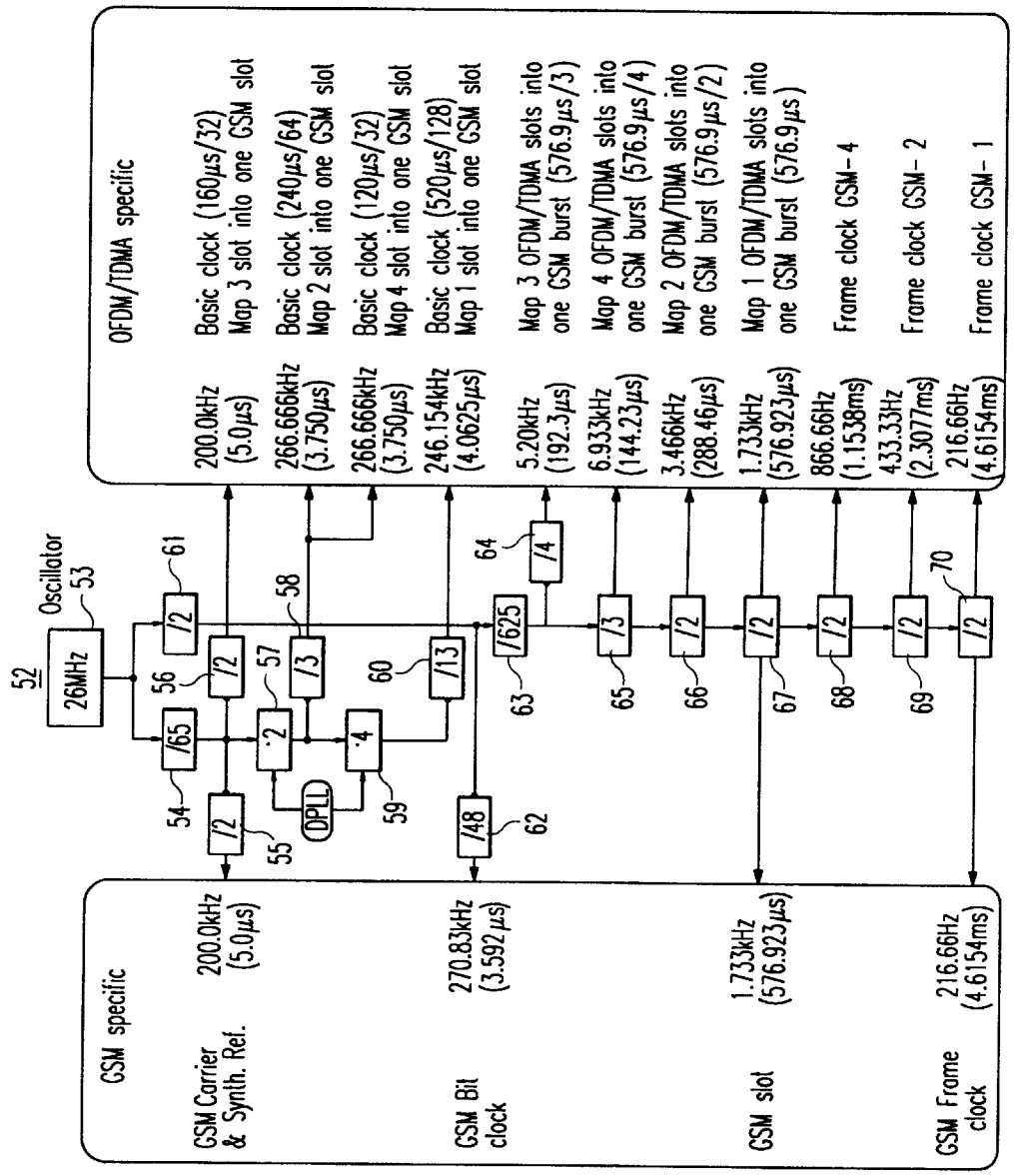
FIG. 13 shows a clock generating means for an OFDM/TDMA-system according to the present invention.

In FIG. 13, a clock generating means 52 for a transmission and/or receiving apparatus is shown which is capable of producing the necessary clocks both for a GSM-system and an OFDM/TDMA-system according to the present invention. The clock generating means 52 is based on the use of a common reference clock of 26 MHz, which is used in the GSM-system. The clock generating means 52 comprises an oscillator 53 which generates a 26 MHz clock. The clock generating means 52 further comprises a number of dividers and/or multipliers 54 to 70, which are selectively chosen for the used OFDM/TDMA-system. In FIG. 13, all possible dividers and multipliers are shown to produce the necessary clocks for all the embodiments described in the present application. However, the elements not necessary for the respectively chosen embodiment can be omitted.

The output of the oscillator 53 is divided by 65 in a divider 54 and further divided by 2 in respective dividers 55 and 56 to produce a clock of 200 kHz for the GSM-system and the OFDM/TDMA-system, respectively. In the OFDM/TDMA-system, the 200 kHz clock is the basic clock for the mapping of 3 OFDM/TDMA timeslots into one GSM timeslot. In the GSM-system, the 200 kHz clock is the carrier and synthesizer reference clock.

The output of the divider 54 is multiplied by 2 in a multiplier 57 and further divided by 3 in a divider 58 to generate a clock of 266.666 kHz which is the basic clock in the OFDM/TDMA-system for the mapping of one OFDM/TDMA-timeslot into one GSM timeslot and for the mapping of 4 OFDM/TDMA timeslots into one GSM timeslot. The output of the multiplier 57 is further multiplied with 4 in a multiplier 59 and then divided by 13 in a divider 60 to produce a clock of 246.154 kHz which is the basic clock in the OFDM/TDMA system for the mapping of one OFDM/TDMA timeslot in one GSM timeslot.

The output of the oscillator 53 (26 MHz) is divided by 2 in a divider 61 and further divided by 48 in a divider 62 to produce a clock of 270.83 kHz, which is the bit clock in the GSM-system. The output of the divider 61 is further divided by 625 in a divider 63 and then divided by 4 in a divider 64 to produce a clock of 5.20 kHz, which is the necessary clock in the OFDM/TDMA-system for the mapping of 3 OFDM/TDMA timeslots into one GSM timeslot.

The output of the divider 63 is further divided by 3 in a divider 65 to produce a clock of 6.933 kHz, which is a necessary clock for the OFDM/TDMA-system for the mapping of 4 OFDM/TDMA timeslots into one GSM timeslot.

The output of the divider 65 is further divided by 2 in a divider 66 to produce a clock of 3.466 kHz, which is a necessary clock in the OFDM/TDMA-system for the mapping of 2 OFDM/TDMA timeslots into one GSM timeslot. The output of the divider 66 is further divided by 2 in a divider 67 to produce a clock of 1.733 kHz, which is a necessary clock in the OFDM/TDMA-system for the mapping of one OFDM/TDMA timeslot into one GSM timeslot. The clock of 1.733 kHz is also a necessary clock in the GSM-system for the GSM timeslots.

The output of the divider 67 is further divided by 2 in a divider 68 to produce a clock of 866.66 Hz, which is the frame clock in an OFDM/TDMA-system, in which the operation mode is based on frames of a duration of 1,1538 ms (which is exactly ¼ of the GSM frame length). The output of the divider 68 is further divided by 2 in a divider 69 to produce a clock of 433.33 Hz, which is the frame clock in an OFDM/TDMA-system, in which the operation mode is based on frames of a duration of 2,3077 ms (which is exactly ½ of the GSM frame length). The output of the divider 69 is further divided by 2 in a divider 70 to produce a clock of 216.66 Hz, which is the frame clock in an OFDM/TDMA-system in which the operation mode is based on frames of a duration of 4,6154 ms (which is exactly one GSM frame length). The clock of 216.66 Hz is also the frame clock in the GSM-system.

Using the proposed division rates and clock multipliers all necessary clock signals for generating the necessary OFDM/TDMA-timeslots and bursts can be easily generated. A system not using all the proposed OFDM/TDMA-structures can be implemented omitting the not-used branches in the shown clock tree. All the parameters (subcarrier number, subcarrier spacing, mapping into GSM-timeslots, FFT resolution) have been specified to be easily GSM compatible and can be derived from a common GSM clock oscillator.

The present invention comprises a burst (time-domain) and frequency slot allocation of a OFDM/TDMA-system, which is as far as possible backward compatible to the existing GSM-burst and frequency structure. The parameters of the OFDM/TDMA-system are chosen to support flexible band width services in the mobile environment.

Figures 14, 14A, 14B, 14C:
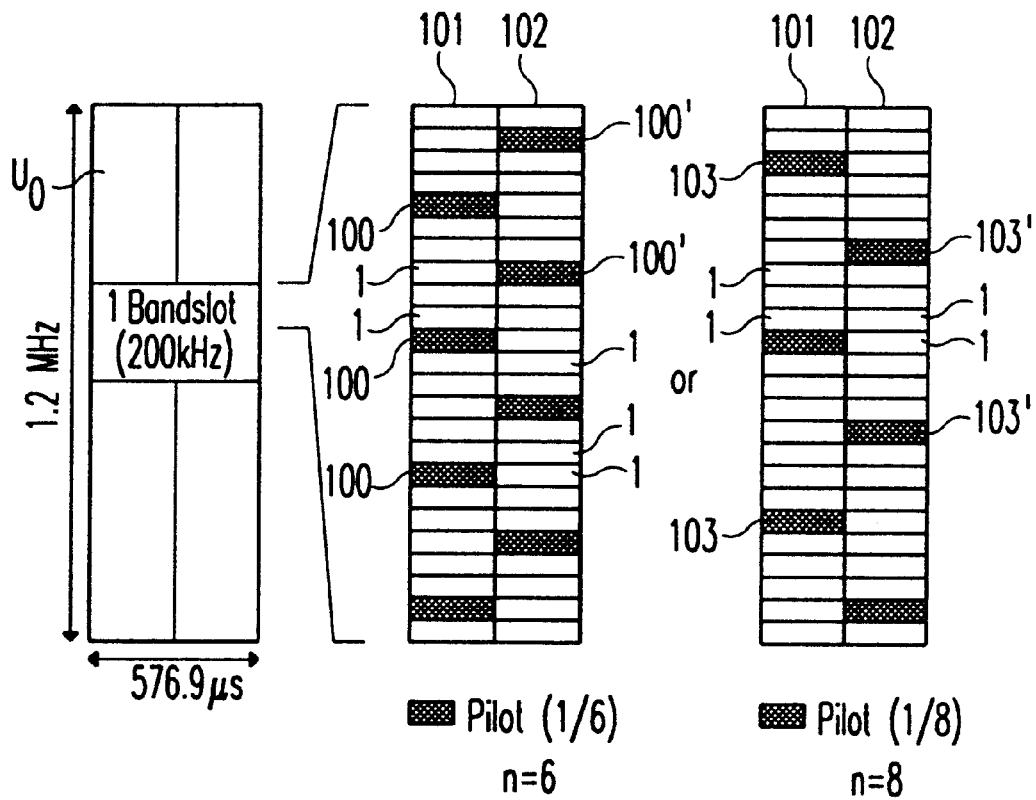
FIG. 14 shows a schematic diagram of the allocation of pilot symbols according to the present invention.

FIG. 14 shows a schematic diagram for explaining the allocation of the pilot symbols according to the present invention. In FIG. 14, a OFDM/TDMA-channel $U_0$ is shown. The channel $U_0$ shown in this example comprises six GSM-frequency-channels. As explained above, the transmission band of the OFDM/TDMA system can be different from the GSM transmission band so that the subcarriers are allocated corresponding to the bandwidth of the GSM frequency channels. In the explained case, however, the OFDM/TDMA channels are allocated to the GSM frequency channels. Since the bandwidth of one GSM-frequency-channel is 200 kHz, the bandwidth of the channel $U_0$ in this case is 1,2 MHz. The case shown in FIG. 14 corresponds to the first embodiment explained above, in which the total number of subcarriers allocated to one GSM-frequency-channel is 48, so that two OFDM/TDMA-timeslots 101 and 102 are mapped into one GSM-timeslot, which has a duration of 5676,9 µs. The general structure of the OFDM/TDMA-channel $U_0$ in this example is shown in FIG. 14A.

In FIG. 14B, subcarriers 1 allocated to the GSM-frequency-channel having a bandwidth of 200 kHz are shown in more detail. For the sake of clarity, only half of the number of 48 subcarriers, namely 24 subcarriers 1 are shown in FIG. 14B. The allocation of 48 subcarriers 1 to one GSM-frequency-channel has the consequence of two OFDM/TDMA-timeslots 101, 102 being mapped into one GSM-timeslot, as becomes clear from FIG. 14. The first OFDM/TDMA-timeslots 101 are shown in the left column of FIG. 14B and FIG. 14C, respectively, whereas the second OFDM/TDMA-timeslot 102 is shown in the right column of FIG. 14B and 14C, respectively.

In FIG. 14B, a pilot symbol 100' is allocated to every $6^{th}$ subcarrier 1. Thereby, the subcarriers of the first OFDM/TDMA-timeslot 101 being modulated with pilot symbols 100 and the subcarriers 1 of the second OFDM/TDMA-timeslots being modulated with pilot symbols 100' are interlaced, so that the pilot symbols 100' of the second timeslot 102 have the respective middle frequency of the pilot symbols 100 of the timeslot 101. The same is true for the example shown in FIG. 14C, in which a pilot symbol 103, 103' is allocated to every $8^{th}$ subcarrier 1. The subcarriers 1 shown in FIGS. 14B and 14C, which are not modulated with a pilot symbol 1, are modulated with data signals. The example shown in FIG. 14B has a pilot symbol density of ⅙=16,6%. The example shown in FIG. 14C has a pilot symbol density of ⅛=12,5%.

It has to be noted, that in the case of the second, third and forth embodiment explained above, the number of subcarriers within one GSM-timeslot is different from the number of subcarriers shown in FIG. 14 and also the number of OFDM/TDMA-timeslots comprised in one GSM-timeslot can be 1, 3 or 4. In the cases, in which 3 or 4 OFDM/TDMA-timeslots are comprised in one GSM-timeslot, the interlacing scheme explained in FIG. 14 has to be applied correspondingly.

Figure 15:
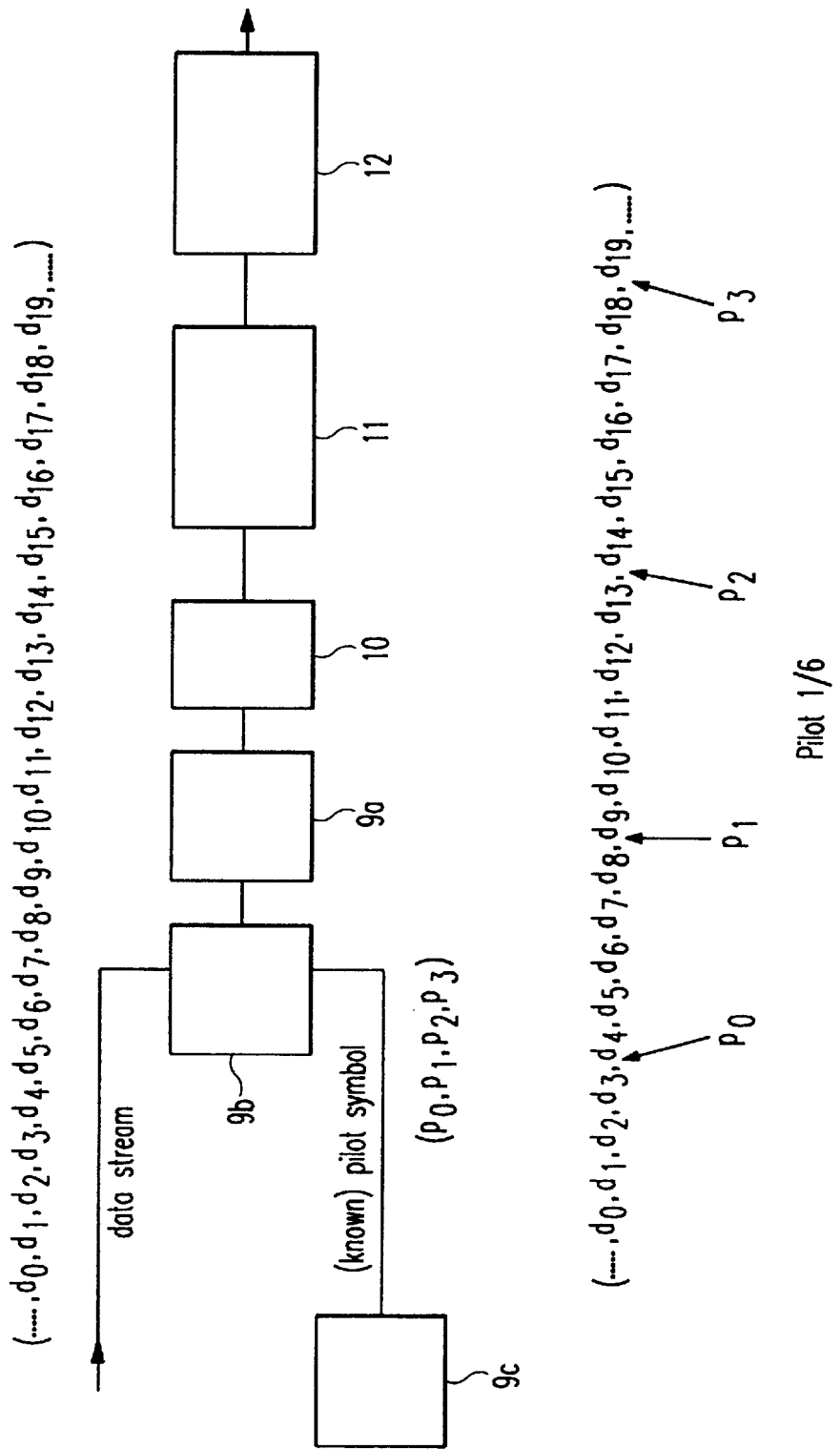
FIG. 15 shows an enlarged part of the block diagram shown in FIG. 9 for explaining the function of the switch means 9b.

In FIG. 15, a portion of the block diagram shown in FIG. 9 is explained in more detail. The interleaving means 8 supplies a data stream, e.g. data signals $d_0$, $d_1$ . . . , via the switch means 9b to the modulation means 9a. The switch means 9b interposes pilot symbols $p_0$, $p^1$, $p_2$, $p_3$ . . . generated in a pilot symbol generation means 9c, which can be for example a memory, in between the data of the data stream, so that a pilot symbol is allocated and modulated on every n-th subcarrier generated in the succeeding modulation means 9a. In the example shown in FIG. 15, the switch means 9b interposes a pilot symbol between the data of the data stream so that a pilot symbol is allocated to every $6^{th}$ subcarrier generated the modulation means 9a. This case corresponds to the case shown in FIG. 14B.

A receiving apparatus, an example of which is; shown in FIG. 10, uses the transmitted pilot symbols to estimate a channel transfer function. The estimated channel transfer function is for example the channel attenuation. An exemplary explanation of the estimation of the channel attenuation in the estimation means 20b and the corresponding equalization of the received data signals in the equalization means 20c of the receiving apparatus according to the present invention is given relating to FIGS. 16 and 17.

Figure 16:
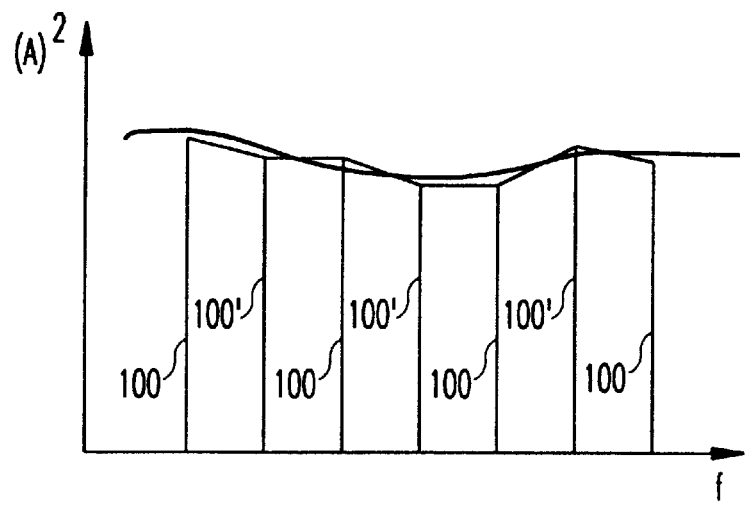
FIG. 16 shows an exemplary channel attenuation diagram for an indoor environment for explaining the estimation procedure for estimating a channel attenuation.

In FIG. 16, an example for a channel attenuation in case of an indoor environment is shown. The transmission system according to the present invention comprising a base station (receiving apparatus) and one or more mobile stations (transmission apparatus) in this case is for example used within a building, so that the moving velocity of the mobile stations is comparatively slow and multipath effects are not so important, so that the channel attenuation is a generally flat curve, as can be seen in FIG. 16. In this case, only a smaller number of pilot symbols is sufficient to allow the receiving apparatus to perform a correct estimation of the channel attenuation. The estimation means 20b compares the received pilot symbols with known pilot symbols, which are for example stored in a memory, and performs a time and/or frequency interpolation for the data modulated subcarriers. The example shown in FIG. 16 can thereby relate to the example shown in FIG. 14C, in which every n-th subcarrier carries a pilot symbol. In this case, the pilot symbols of the two adjacent OFDM/TDMA-timeslots 101 and 102 are interlaced. Thus, the estimation means 20b calculates an estimated attenuation value for each pilot symbol 100 of the first OFDM/TDMA-timeslot 101, and a channel attenuation value for the pilot symbols 100' of the second OFDM/TDMA-timeslot 102. As can be seen in FIG. 16, the pilot symbols 100 and 100' are interlaced equidistantly. Then, the estimation means 19b estimates an interpolation curve connecting the calculated channel attenuation values for the power symbols 100 and 100'. The calculated or estimated channel attenuation curve is then used by the equalization means 20c for equalizing the transmitted data signals.

Figure 17:
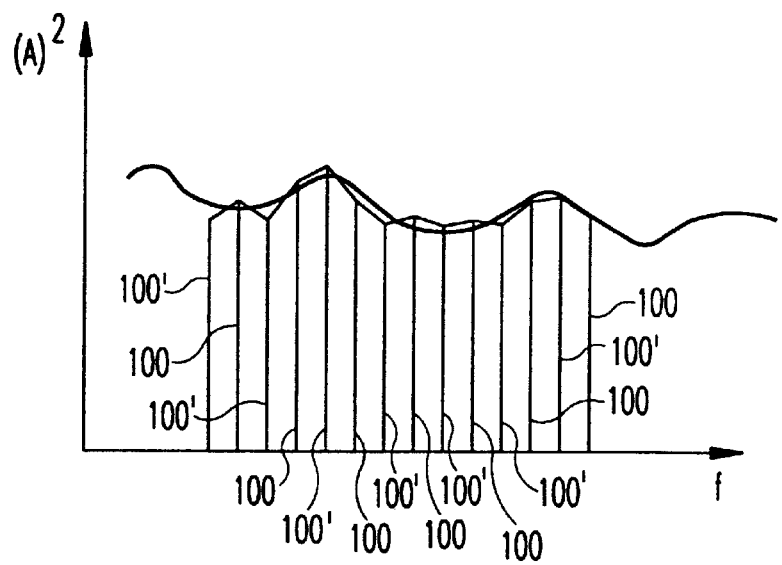
FIG. 17 shows an exemplary channel attenuation diagram for an outdoor environment for explaining the estimation procedure for estimating the channel attenuation.

In FIG. 17, an channel attenuation curve is shown for an outdoor environment. As can be seen in FIG. 17, the curve shows more variations than the curve for the indoor environment shown in FIG. 16. Therefore, more pilot symbols are necessary in this case to assure a correct equalization of the transmitted data signals. Therefore, and as can be seen in FIG. 17, more pilot symbols are allocated to the subcarriers in each GSM-frequency-channel. In this case, for example every $4^{th}$ subcarrier could be modulated with a pilot symbol. As can be seen from FIGS. 16 and 17, the estimation means 20b estimates a channel transfer function, e.g. the channel attenuation, by detection the amplitude and the phase changes of the received known pilot symbol subcarriers. Thereby, two-dimensional equalization-interpolation schemes, e.g. time-domain interpolation using multiple adjacent OFDM/TDMA-timeslots and/or frequency domain interpolation using pilot symbol subcarriers are used. The position of the pilot symbols allocated equidistantly to corresponding subcarriers is, in the case of multiple adjacent OFDM/TDMA-timeslots, different for each OFDM/TDMA-timeslot.

What is claimed is:

1. A transmission apparatus for transmitting signals on the basis of an OFDM/TDMA-system, comprising:
   allocation means for allocating a plurality of subcarriers being orthogonal to each other to a variable number of channels ($U_0$, $U_1$ ... $U_9$), each channel containing a variable number of subcarriers depending on information to be transmitted in said signals,
   wherein said allocation means, for the transmission of said signals in a GSM-system having a constant number of predetermined GSM-frequency-channels and a constant number of predetermined GSM-timeslots being grouped in GSM-frames, allocates a number of said subcarriers corresponding to the bandwidth of said GSM-frequency-channels, so that a multiple of one resulting OFDM/TDMA-timeslot ($T_S$) matches with one or a multiple of one GSM-timeslot, and for allocating a pilot symbol to every n-th subcarrier, n being an integer and n>1, and
   transmission means for transmitting said signals.

2. The transmission method according to claim 1, characterized by, said allocation means, in case a multiple of one resulting OFDM/TDMA-timeslot ($T_S$) matches with one GSM-timeslot, the pilot symbols in adjacent OFDM/TDMA-timeslots are frequency interlaced with respect to each other.

3. The transmission method according to claim 2, characterized by, in said allocation means, the pilot symbols in adjacent OFDM/TDMA-timeslots are symmetrically interlaced, whereby one pilot symbol is allocated to a subcarrier in the frequency middle between two respective pilot symbols of an adjacent OFDM/TDMA-timeslot.

4. The transmission method according to claim 1, characterized in that, in said allocation means, 48 of said subcarriers are allocated corresponding to the bandwidth of said GSM-frequency channels, so that 2 OFDM/TDMA-timeslots match with 1 GSM-timeslot, whereby n=6 or n=8.

5. A transmission method for transmitting signals on the basis of an OFDM/TDMA-system, comprising the steps of:
   allocating a plurality of subcarriers being orthogonal to each other to a variable number of channels $U_0$, $U_1$ ... $U_9$, each channel containing a variable number of subcarriers depending on information to be transmitted in said signals,
   wherein, for the transmission of said signals in a GSM-system having a constant number of predetermined GSM-frequency-channels and a constant number of predetermined GSM-timeslots being grouped in GSM-frames, a number of said subcarriers is allocated corresponding to the bandwidth of said GSM-frequency-channels, so that a multiple of one resulting OFDM/TDMA-timeslot ($T_S$) matches with one or a multiple of one GSM-timeslot, wherein a pilot symbol is allocated to every n-th subcarrier, n being an integer and n>1, and
   transmitting said signals.

6. The transmission method according to claim 5, characterized in that if a multiple of one resulting OFDM/TDMA-timeslot ($T_S$) matches with one GSM-timeslot, the pilot symbols in adjacent OFDM/TDMA-timeslots are frequency interlaced with respect to each other.

7. The transmission method according to claim 6, characterized in that the pilot symbols in adjacent OFDM/TDMA-timeslots are symmetrically interlaced, whereby one pilot symbol is allocated to a subcarrier in the frequency middle between two respective pilot symbols of an adjacent OFDM/TDMA-timeslot.

8. The transmission method according to claim 5, characterized in that 48 of said subcarriers are allocated corresponding to the bandwidth of said GSM-frequency channels, so that 2 OFDM/TDMA-timeslots match with 1 GSM-timeslot, whereby n=6 or n=8.

9. A receiving method for receiving signals transmitted by means of a transmission method according to claim 5, characterized by the steps of:
   receiving the transmitted signals,
   estimating a channel transfer function on the basis of the received pilot symbols, and
   equalizing data symbols transmitted in said signals on the basis of the estimated transfer function.

10. The receiving method according to claim 9, characterized in that said estimating step, a time and/or frequency interpolation on the basis of the received pilot symbols is performed to generate said estimated channel transfer function.

11. The receiving method according to claim 9, characterized in that said channel transfer function is the channel attenuation.

12. A receiving apparatus for receiving signals transmitted by means of a transmission method according to claim 5, characterized by:
   a receiving means for receiving the transmitted signals,
   an estimation means for estimating a channel transfer function on the basis of the received pilot symbols, and an equalization means for equalizing data symbols transmitted in said signals on the basis of the estimated transfer function.

13. The receiving apparatus according to claim 12, characterized in that said estimation means performs a time and/or frequency interpolation on the basis of the received pilot symbols to generate said estimated channel transfer function.

14. The receiving method according to claim 12, characterized in that said channel transfer function is the channel attenuation.

15. An OFDM/TDMA system comprising at least one transmission apparatus according to claim 5 and a receiving apparatus according to claim 12.

* * * * *